United States Patent [19]

Mery

[11] Patent Number: 4,699,254
[45] Date of Patent: Oct. 13, 1987

[54] SPRING FOR A DISC BRAKE AND DISC BRAKE EQUIPPED WITH SUCH A SPRING

[75] Inventor: Jean-Claude Mery, Pavillons-sous-Bois, France

[73] Assignee: Bendix France, Paris, France

[21] Appl. No.: 860,975

[22] Filed: May 8, 1986

[30] Foreign Application Priority Data

May 22, 1985 [FR] France ................................ 85 07709

[51] Int. Cl.⁴ ............................................. F16D 65/38
[52] U.S. Cl. ................................. 188/73.36; 188/73.38; 192/30 V
[58] Field of Search ............... 188/73.35, 73.36, 73.38, 188/205 A; 192/30 V

[56] References Cited

U.S. PATENT DOCUMENTS

| 4,463,837 | 8/1984 | Courbot | 188/73.38 |
| 4,515,249 | 5/1985 | Escarabajal et al. | 188/73.38 |

FOREIGN PATENT DOCUMENTS

| 2399 | 6/1979 | European Pat. Off. |
| 30502 | 6/1981 | European Pat. Off. |
| 0059128 | 9/1982 | European Pat. Off. |
| 1927459 | 5/1970 | Fed. Rep. of Germany |
| 2345733 | 3/1975 | Fed. Rep. of Germany |
| 2514383 | 11/1975 | Fed. Rep. of Germany |
| 2408766 | 6/1979 | France |
| 1532572 | 11/1978 | United Kingdom |
| 2056601 | 3/1981 | United Kingdom |

*Primary Examiner*—George E. A. Halvosa
*Attorney, Agent, or Firm*—Larry J. Palguta; Ken C. Decker

[57] ABSTRACT

The invention relates to spring (40) for a disc brake. The spring is mounted elastically in an opening (68) of a caliper and exerts on the support plates (26, 28) a radial force (F1) as well as a tangential force (F'5) ensuring that the plates assume a preferred lateral position. The spring (40) comprises a metal leaf with two main arms (42, 44) connected to each other and to a central arm (48) by a main fold (46), the spring having the general shape of a "trident", the end prongs of which comprise the main arms (42, 44), the latter cooperating by way of their free ends (50) with a surface (52) formed on the caliper (10) and by way of central portions (54) with bearing surfaces (56) formed on the support plates, the central arm (48) having at its free end (62) a Z-shaped fold cooperating with two surfaces (64, 66) of the caliper, the main fold (46) having a lug (74) cooperating radially with another surface (76) of the caliper (10).

8 Claims, 9 Drawing Figures

SPRING FOR A DISC BRAKE AND DISC BRAKE EQUIPPED WITH SUCH A SPRING

The present invention relates to a spring for a disc brake with a sliding caliper and to a disc brake equipped with such a spring.

The invention concerns more particularly a multiple-function spring intended to equip a disc brake, the caliper of which slides in relation to a fixed support by means of at least two complementary axially sliding surfaces which are formed on the caliper and on the fixed support and which are kept in contact with each other by elastic means.

Among the disc brakes of the type mentioned above, are disc brakes where the caliper is slideably mounted in relation to the fixed support by means of a small axial column which is slideably received in a corresponding bore and by means of two sliding surfaces formed opposite each other on the caliper and on the fixed support. Such a brake is described and shown in GB-A-1,532,572. In such a brake, it is necessary to provide elastic means in order to keep the surfaces in contact with each other as well as anti-rattle springs intended to press the friction components into the opening provided in the fixed support to receive them. The document EP-A-0,030,502 proposes the use of a single spring arranged between the caliper and the friction components, performing the double function of keeping the sliding surfaces in contact with each other and of acting as an anti-rattle spring for the friction components.

Disc brakes also exist where the caliper is slideably mounted on the fixed support by means of two pairs of complementary sliding surfaces formed on the caliper and on the fixed support, respectively, the pairs of sliding surfaces being kept in contact with each other by means of two springs arranged on either side of the median axial plane of the brake. Such a brake is described and illustrated in the document FR-A-2,408,766. In such a brake, it is necessary, moreover, to provide anti-rattle springs for the friction components in order to keep the latter pressed inside the opening of the fixed support in which they are accommodated.

In the brakes which have just been described, it may be desirable to mount a particular type of friction component to which a permanent tangential force must be applied, keeping these friction components pressed inside the opening of the fixed support in a preferred lateral position. Such a type of friction component is described and illustrated in the document EP-A-0,002,399. It will be noted, when reading this document, that it is necessary to provide for each of the friction components a separate spring keeping each component pressed in its preferred lateral position as well as the two springs for holding the above-mentioned caliper in position.

The Japanese Utility Model Application No. 54-088653 U published on Jan. 21, 1981 under No. JP-U-56-7130 (and corresponding to GB-A-2,056,601) describes a disc-brake spring mounted in a seating under the arch of the caliper and cooperating with the friction components so as to stress the latter radially and tangentially so as to ensure that they are kept in a preferred lateral position. In this document, the spring has the general shape of a very wide V with end shoulders and is braced laterally against two opposite walls of the arch seating. This arrangement is thus affected by the variations in the dimensions of the spring and of the arch seating as well as by the different tolerances for the respective positions of the friction components and the caliper.

It is an object of the present invention to provide a disc-brake arrangement with a spring which acts as an anti-rattle spring and keeps the friction components in a preferred lateral position, has a simplified structure, is compact and robust, is unaffected by the problems of tolerance and has an improved elastic action on the friction components by ensuring, elastically, contact between two complementary axially sliding surfaces.

According to the invention there is provided a spring for a disc brake of the type comprising a caliper mounted, so as to slide parallel to the axis of a rotating disc, on a fixed support by means of at least two axially sliding surfaces formed on the caliper and on the fixed support and held elastically in contact with each other, and two friction components which are anchored and slide axially inside an opening of the fixed support so as to come into friction engagement with the opposite sides of the disc when a brake actuator is operated, the spring being mounted elastically in an opening formed in the arch of the caliper and exerting on the support plates of the friction components a radial force directed substantially along a radius of the disc and in the direction of the axis of the latter and a tangential force perpendicular to the radial force so as to stress each of the friction components tangentially to the circumference of the disc so as to ensure that the latters are held in a preferred lateral position, characterized in that it comprises a folded metal leaf with two main arms connected to each other and to a central arm by a main fold, the spring having the general shape of a "trident", the end prongs of which consist of the main arms, the latter being capable of cooperating, on the one hand, by means of their free ends, with a substantially flat surface formed on the caliper and extending parallel to the axis of the disc and, on the other hand, by means of central portions, with bearing surfaces formed on each of the support plates, the central arm having on its free end a Z-shaped fold capable of cooperating with two surfaces of the caliper forming an angle $\alpha$ smaller than the angle $\beta$ formed by two consecutive parts of the Z-shaped fold, the main fold having a lug extending substantially parallel to the three arms and away from the latter and capable of cooperating radially with another surface formed on the caliper, the said central portions thus exerting on the support plates an elastic force consisting of the radial force and the tangential force.

With such an arrangement, the elastic action of the spring is obtained essentially from the relative flexures of the three arms connected by the main fold, as a result of these arms cooperating with the surfaces of the caliper and of the support plates located close to each other. The lug mounted on the main fold ensures that the two axially sliding surfaces are kept in contact with each other and positions the spring in relation to the caliper.

According to another embodiment of the invention, the distance between the main fold and the Z-shaped fold of the central arm is such that the spring is unable to escape from the opening formed in the arch of the caliper when this spring is not acting on the friction components.

With such an arrangement, the spring may be held elastically in the opening of the caliper without the risk of being lost or deformed during disassembly, for example in order to replace the friction components.

The invention will now be described by way of example with reference to the accompanying drawings in which.

Figure 1:
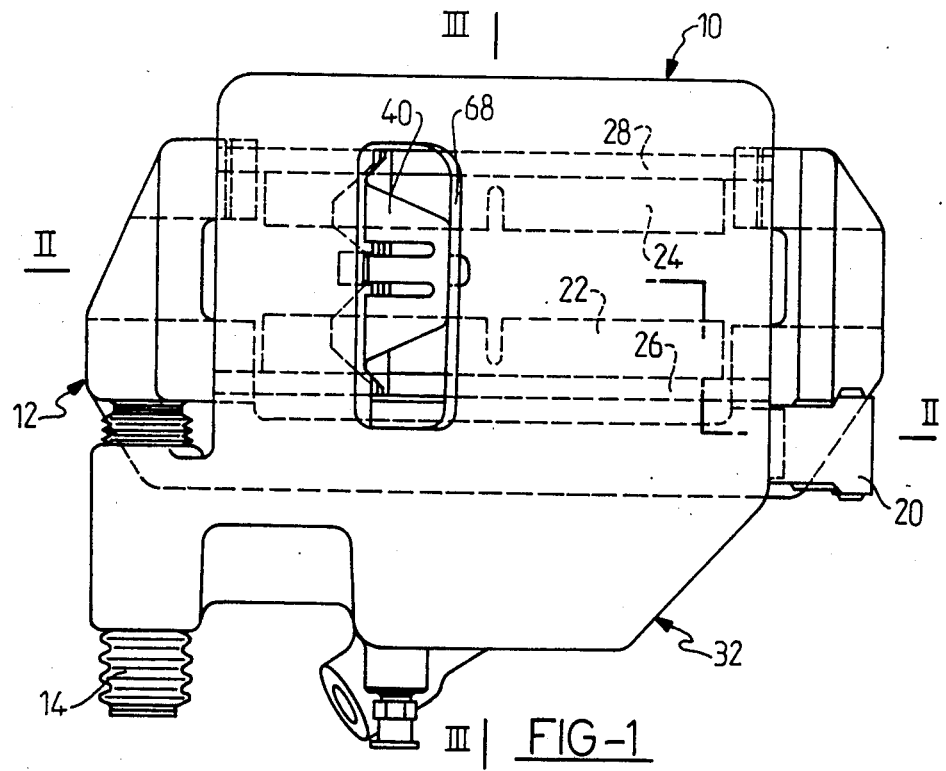
FIG. 1 shows a disc brake provided with a spring according to the present invention.
Figure 2:
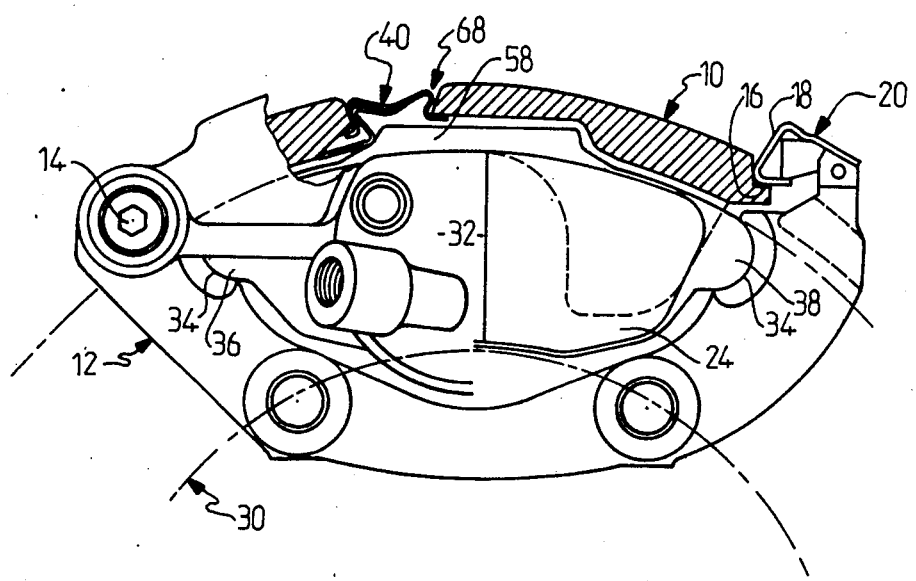
FIG. 2 is a view, in partial section, taken along the line II—II of FIG. 1.
Figure 3:
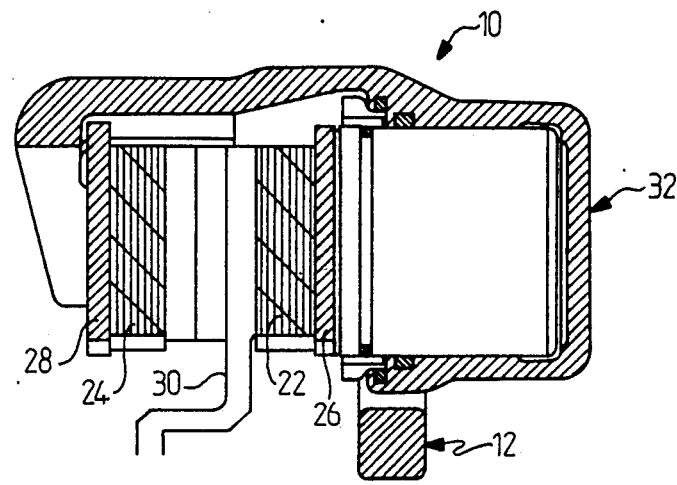
FIG. 3 is a sectional view, taken along the line III—III of FIG. 1.

The disc brake shown in FIGS. 1 to 3 is of the type having a caliper 10 slideably mounted on a fixed support 12 by means of a small axial column 14. Sliding of the caliper 10 in relation to the fixed support 12 is also ensured by means of axially sliding surfaces 16 and 18 formed on the caliper 10 and on a spring 20 integral with the fixed support 12, respectively. The disc brake has, in addition, two friction components 22 and 24 provided with support plates 26 and 28, respectively, capable of friction-type engagement with a rotating disc 30 when a hydraulic brake actuator 32 is operated. The friction components 22 and 24 are anchored and slide inside an opening 34 formed in the fixed support 12. In the example shown, the two friction components 22 and 24 have ends 36 and 38 with a circular profile cooperating with the complementary circular profiles of the opening 34. Such a type of friction component is described and illustrated in greater detail in the EP-A-0,002,399. For this type of friction component, it is desirable to exert a tangential force on the support plate, which keeps the latter in a preferred lateral position, pressed inside the opening provided in the fixed support 12.

Figure 4:
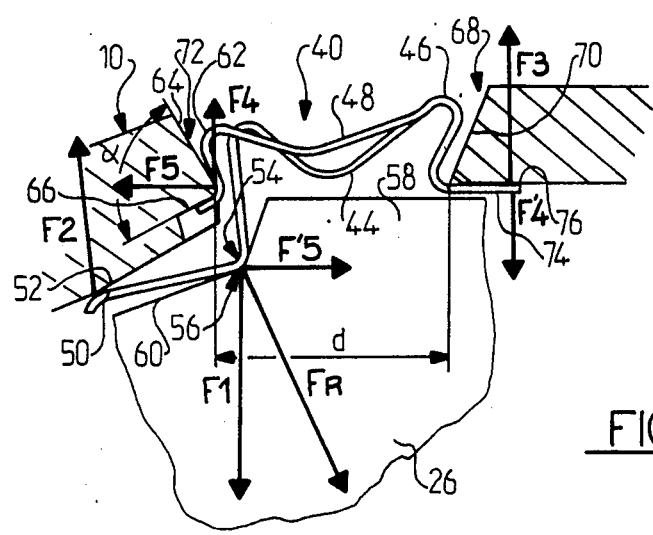
FIG. 4 is an enlarged view of a detail of FIG. 2 showing the mounting of the spring inside the arch of the disc-brake caliper.

The disc brake shown in FIGS. 1 to 3 is provided with a spring 40 according to the present invention. For the description of the spring 40, reference will be made in particular to FIGS. 4 to 6. The spring 40 consists of a folded metal leaf which has two main arms 42 and 44 connected to each other by a main fold 46 and connected to a central arm 48 again by means of the main fold 46. As can be seen more particularly in FIG. 5, the spring has the general shape of a "trident", the end prongs of which comprise the main arms 42 and 44 and the central prong of which comprises the central arm 48. Each of the main arms has a free end 50 capable of cooperating with a substantially flat surface 52 of the sliding caliper 10, as shown in FIG. 4, this surface 52 extending parallel to the axis of the disc 30. Each of the arms 42 and 44 has a central portion 54 in the form of a gutter capable of cooperating with bearing surfaces 56 formed on each of the support plates 26 and 28, as shown in FIG. 4. In the embodiment shown, the bearing surfaces 56 consist of a bearing angle formed on a projection 58 arranged at the top of the support plates 26 and 28, and of the upper surface 60 of these support plates. The free end 62 of the central arm 48 has a Z-shaped fold, the hollow of which, closest to the end, forms an angle $\beta$ as indicated in FIG. 6 between two consecutive parts of the fold, this angle $\beta$ being greater than the angle $\alpha$ formed by two surfaces 64 and 66, themselves formed on the caliper 10 and extending parallel to the axis of the disc 30. With reference to FIGS. 1, 2 and 4, it can be seen that the spring 40 is accommodated in an opening 68 formed in the arch of the caliper 10 and having two edges 70 and 72 arranged circumferentially at a distance from each other, the surfaces 52, 64 and 66 being situated in the vicinity of the first edge 72. The central fold 46 has a lug 74 which extends substantially parallel to the three arms 42, 44 and 48 and away from the latter and which is capable of cooperating radially with another surface 76 formed on the caliper 10 in the vicinity of the second edge 70.

Figure 5:
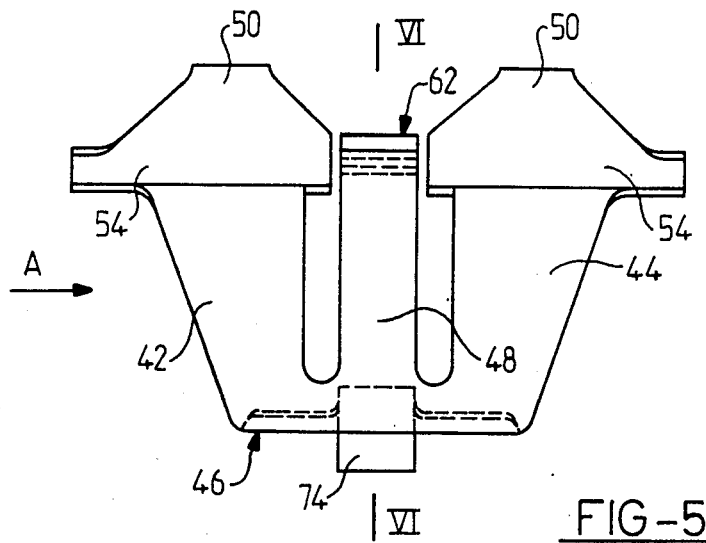
FIG. 5 is a plan view of the spring according to the present invention when unmounted.
Figure 6:
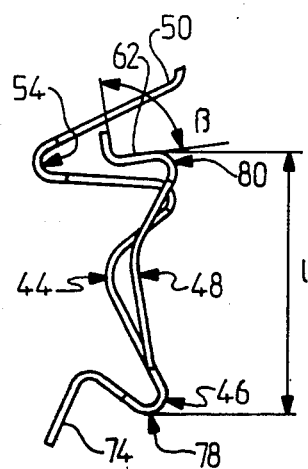
FIG. 6 is a sectional view, taken along the line VI—VI of the spring shown in FIG. 5, viewed in the direction of the arrow A.

With reference to FIGS. 1 and 5, it can be seen that the main arms 42 and 44 have a cross-section which gradually increases from the free end 50 to the central portion 54 and decreases from the central portion 54 to the main fold 46. With reference to FIG. 6, it can be seen that the external surface 78 of the main fold 46 is located at a distance 1 from the external surface 80 of the Z-shaped fold of the central arm 48. With reference to FIG. 4, d defines the minimum distance between the edges 72 and 70 of the opening 68 arranged circumferentially at a distance from each other. According to the invention, the distance 1 on the spring 40, when the latter is not tensioning the friction components, is greater than the distance d, so that the spring remains fixed inside the opening 68 formed in the caliper 10. On the other hand, when the spring 40 is in its normal operating position, as shown in FIG. 4, the main fold 46 must not be in contact with the caliper 10.

FIG. 4 shows the different elastic actions which the spring 40 produces or undergoes. In particular, it can be seen that the tangential forces which act on the friction components tangentially to the circumference of the disc are produced by a relative circumferential flexure of the main arms 42 and 44 in relation to the central arm 48. These are the forces F5 on the central arm 48 and F'5 exerted by the main arms on the bearing surfaces 56 of the friction components. The values F5 and F'5 are, of course, equal. The radial action on the friction components is denoted by F1 and the latter consists of the reactions to the forces F2, i.e. the force of the end 50 on the surface 52, plus the force F4, i.e. the reaction of the central arm 48 on the surfaces 64 and 66, plus the resultant of the two opposite but unequal forces F3 and F'4.

Therefore, it can be stated that, owing to the structure of the spring, on the one hand the friction components are fully subjected to an inwardly directed radial force and a tangential force in a preferred direction and that the reactions to these different forces (F2, F4, F3-F'4) stress the caliper 10 radially outwards so as to apply this caliper 10 or, more precisely, its sliding surface 16 against the sliding surface 18 integral with the fixed support 12.

It can also be seen that, as a result of the invention, the forces generated are essentially defined by the geometry of the spring, the manufacturing tolerances of the caliper playing only a very small part and the lug 74 being free to move circumferentially in relation to the edge 70 of the opening 68.

It is important that the angle $\alpha$ defined above should be smaller than the angle $\beta$ formed by the Z-shaped end of the central arm 48 so as to allow the central arm 48 to follow the movements imposed by the central portions 54 through the main fold 46.

It is also in order to allow the elastic deformations of the three arms 42, 44 and 48 and therefore the movements of the main fold 46 that it is necessary, in the operating position, for the main fold 46 to be located at a distance from the edge 70 of the opening 68.

Figure 8:
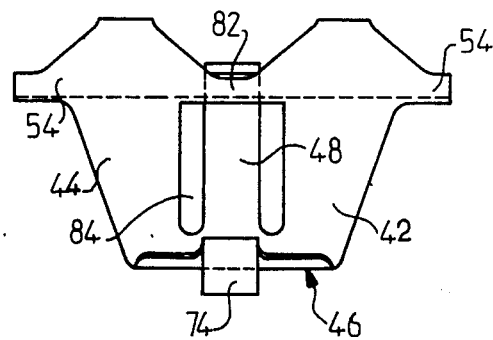
FIG. 8 is a bottom view of the spring, in accordance with the arrow XIII shown in FIG. 7.
Figure 7:
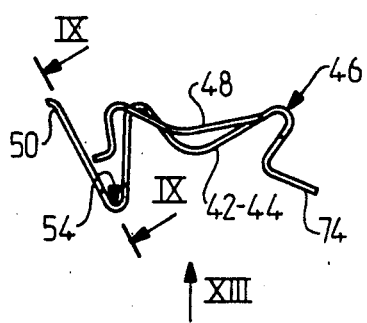
FIG. 7 is a view, similar to that of FIG. 6, of a variation of the spring forming the subject of the present invention.
Figure 9:
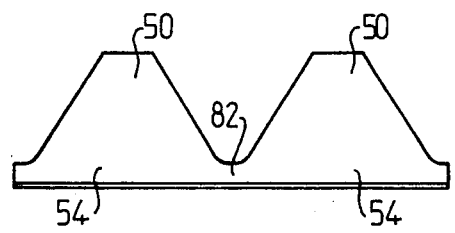
FIG. 9 is a sectional view taken in the direction IX—IX indicated in FIG. 7.

With reference to FIGS. 7 to 9 which show a variation of the spring according to FIGS. 4 to 6, it can be seen that the central portions 54 are connected to each other at right angles to the Z-shaped fold of the central arm 48 by means of a connecting portion 82 formed when the central arm 48 is cut out by means of an opening 84, the latter being such that, before folding of the arms 42, 44 and 48, the unfolded length of the central arm 48 is shorter than the corresponding length of the opening 84. As a result of this variation, the rigidity of the central portions 54 is increased and the latter are kept more easily parallel to the axis of the disc 30.

It can be understood that, as a result of the invention, a simple multiple-function spring has been produced which does not require any special operations for machining the caliper 10, the forces being essentially produced by relative movements of the arms with respect to each other.

I claim:

1. A spring for a disc brake of the type comprising a caliper mounted parallel to an axis of a rotating disc and mounted slideably on a stationary support by means of at least two axially sliding surfaces formed on the caliper and stationary support and held elastically in contact with each other, and two friction components which are anchored and slide axially in an opening of the stationary support so as to come into frictional engagement with opposite sides of the disc when a brake actuator is operated, the spring being mounted elastically in an opening formed in an arch of the caliper and exerting on support plates of the friction components a radial force directed substantially along a radius of the disc and toward the axis and a tangential force perpendicular to the radial force so as to stress each of the friction components tangentially to the circumference of the disc in order to ensure that the components are held in a preferred lateral position, characterized in that the spring comprises a metal leaf with two main arms connected to each other and to a central arm by a main fold, the spring having the general shape of a trident with end prongs of which comprise the main arms, the main arms cooperating by means of free ends with a substantially flat surface formed on a radially inner side of the caliper and extending parallel to the axis of the disc, and the main arms cooperating by means of central portions with bearing surfaces formed on the support plates, the central arm having at a free end a Z-shaped fold cooperating with two surfaces of the caliper forming an angle $\alpha$ smaller than an angle $\beta$ formed by two consecutive parts of the Z-shaped fold, one surface of the two surfaces formed on the radially inner side of the caliper and engaged by a portion of the free end of the Z-shaped fold, the main fold having a lug extending substantially parallel to and away from the three arms and cooperating radially with another surface formed on the radially inner side of the caliper, the central portions exerting on the support plates an elastic force consisting of the radial force and the tangential force, the two surfaces and flat surface situated in the vicinity of a first edge of the opening formed in the arch and which extends axially, the another surface situated in the vicinity of a second edge of the opening formed in the arch and which is arranged circumferentially at a distance from the first edge, the main arms, central arm, and lug engaging the surfaces situated on the radially inner side of the caliper so that forces exerted by the spring on the caliper are exerted principally on the radially inner side of the caliper, and the main fold disposed apart from the second edge so that the main fold may move freely and permit deformable movements of the three arms.

2. The spring for a disc brake according to claim 1, characterized in that the bearing surface formed on each of the support plates consists of a bearing angle formed on a projection arranged atop the support plate, and the central position resting within the bearing angle.

3. The spring for a disc brake according to claim 2, characterized in that at least one of the main arms has a cross-section increasing from the free end to its central portion.

4. The spring for a disc brake according to claim 2, characterized in that at least one of the main arms has a cross-section decreasing from the the central portion to its main fold.

5. The spring for a disc brake according to claim 2, characterized in that the central portions are folded to form gutters, an external surface of each gutter resting within the bearing angle.

6. The spring for a disc brake according to claim 1, characterized in that the main fold has the shape of a gutter, an external surface of which is separated from an external surface of the Z-shaped fold of the central arm by a distance which is greater than a minimum distance defined between the circumferentially spaced edges of the opening formed in the arch when the central portions are not acting in any way on the bearing surfaces.

7. The spring for a disc brake according to claim 1, characterized in that the two main arms are connected to each other in a region of the central portions by a connecting portion forming a single piece with the spring.

8. The disc brake of the type comprising the caliper mounted slidably on the fixed support by means of a small axial column and the two axially sliding surfaces formed on the caliper and stationary support, respectively, and the brake having a spring according to claim 1, characterized in that the spring stresses elastically the caliper radially outwardly to ensure that the axial sliding surfaces are maintained in contact with each other.

* * * * *